United States Patent [19]
Gardner

[11] 3,889,464
[45] June 17, 1975

[54] EXHAUST EMISSION CONTROL SYSTEMS AND DEVICES

[76] Inventor: Conrad O. Gardner, 22905 108th West, Edmonds, Wash. 98020

[22] Filed: Dec. 20, 1973

[21] Appl. No.: 426,516

[52] U.S. Cl. ............... 60/286; 23/277 C; 23/288 F; 60/296; 60/300
[51] Int. Cl. .............................................. F01n 3/14
[58] Field of Search ............ 60/288, 287, 296, 295, 60/284, 301, 300, 286; 23/288 F, 277 C

[56] References Cited
UNITED STATES PATENTS

| | | | |
|---|---|---|---|
| 3,072,457 | 1/1963 | Bloch | 60/288 |
| 3,188,167 | 6/1965 | Specht | 60/288 |
| 3,211,534 | 10/1965 | Ridgway | 60/296 |
| 3,581,490 | 4/1968 | Morris | 60/295 |
| 3,662,540 | 5/1972 | Murphey | 60/301 |
| 3,732,696 | 5/1973 | Masaki | 60/286 |
| 3,808,806 | 5/1974 | Nakamura | 60/289 |

*Primary Examiner*—Douglas Hart
*Attorney, Agent, or Firm*—Morris A. Case

[57] ABSTRACT

A catalytic converter structure in the exhaust passage of an internal combustion engine having means for replacement of the poisoned or contaminated catalyst bearing support member from an outer housing in the exhaust passage when the processed exhaust quality falls below required levels or upon an engine vehicle elapsed operating time or vehicle mileage basis. Catalyst chamber converter structures and systems provide reaction device temperature control not dependent upon exhaust gas warm up of one to three minutes thereby preventing emission of undesirable gas constituents during engine warm up.

2 Claims, 7 Drawing Figures

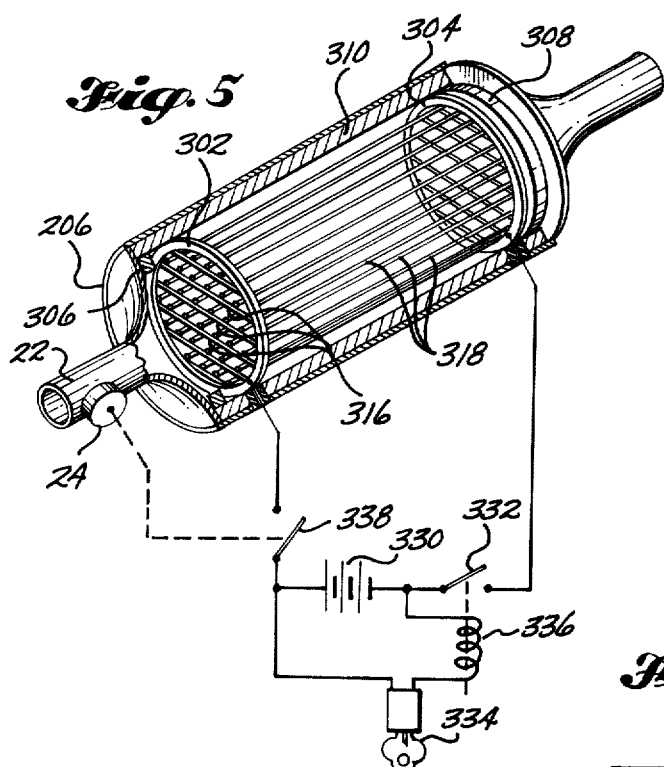
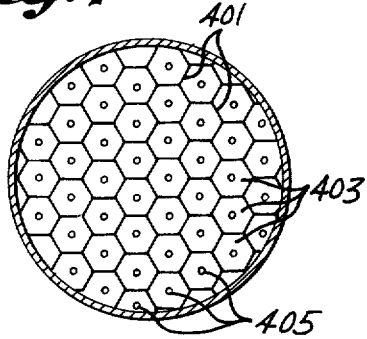
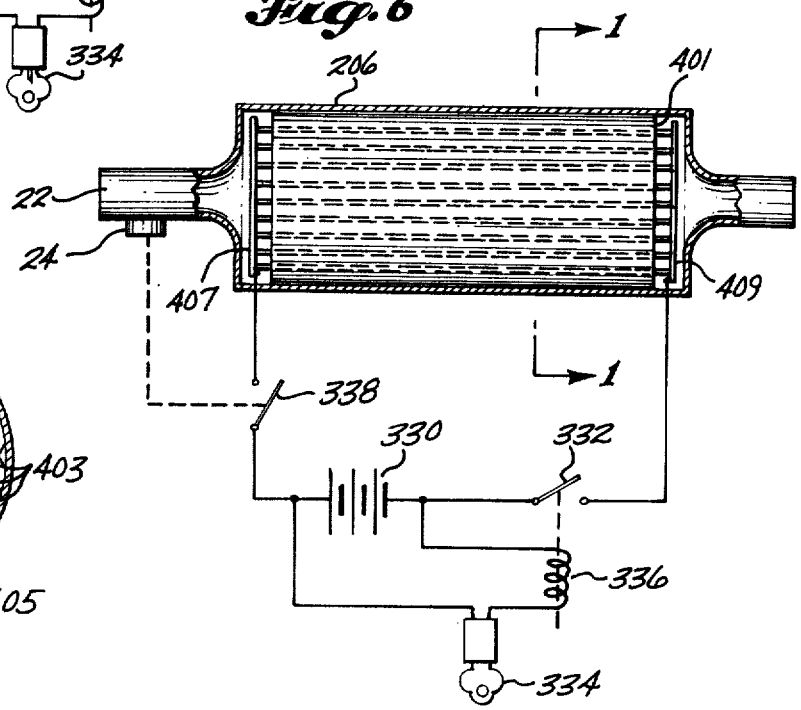

EXHAUST EMISSION CONTROL SYSTEMS AND DEVICES

This is a division, of application Ser. No. 300719, filed Oct. 25, 1972.

This invention relates to exhaust emission processing, and more particularly to catalytic converter structures utilized in exhaust passages of internal combustion engines.

The present state of the art comprises the utilization of exhaust gas reaction devices such as catalytic converters or thermal reaction devices coupled in the exhaust passage (tail pipe) between the combustion chamber and the outlet leading to the atmosphere. One type of known catalytic converters contain pellets coated with the selected catalytic material such as platinum or palladium or combinations thereof. While oxidizing catalysts may be used in the catalytic converter, also reducing catalysts may be used for processing oxides of nitrogen. Only expensive catalytic materials so far appear successful and other cheaper materials such as oxides of copper and nickel have not yet had the same measure of success which might indicate a potential for successful lifetimes of 50,000 miles of vehicle operation. Due to gasoline impurities, e.g., lead and for other reasons even catalytic converters representative of the state of the art which contain the expensive catalysts cannot be warranted for 50,000 mile use.

A further serious problem in the case of catalytic converters representative of the state of the art is that they are passive devices dependent upon heating up to efficient reaction temperatures by the exhaust gases which pass through them and as a consequence permit the transmission to the atmosphere of unpurified exhaust gases, e.g., during the first 1 to 3 minutes of engine warm up.

It is therefore an object of this invention to provide catalytic converter structures wherein means are provided for controlling the catalyst temperature for more efficient converter processing.

It is a further object of this invention to provide in an exhaust processing system including an afterburner and catalytic converter, means for utilizing afterburner heating to heat exhaust gases inputted to the converter at least during the exhaust gas warm up period.

It is another object of this invention to provide a converter structure having a catalyst support means which is removable from an outer chamber in the exhaust pipe.

It is still another object of this invention to provide in a catalytic converter, a filamentary structure for indirect heating or direct heating and support of catalytic coatings.

Further objects, features, and advantages of the invention will readily become apparent from the following specification and from the drawings, in which:

FIG. 5 is a catalytic converter structure having filamentary heating means for supporting and maintaining the catalytic material surface coating the filaments above a predetermined temperature;

FIG. 6 is a catalytic converter structure having a honeycomb cross section for supporting the catalytic coatings along the honeycomb channels and provided with filamentary heating filaments centered and strung along the individual honeycomb channels; and, FIG. 7 is a cross section taken along the line 1—1 of the converter of FIG. 6 illustrative of the arrangement of the heating filaments centered in the honeycomb channels.

Figure 1:
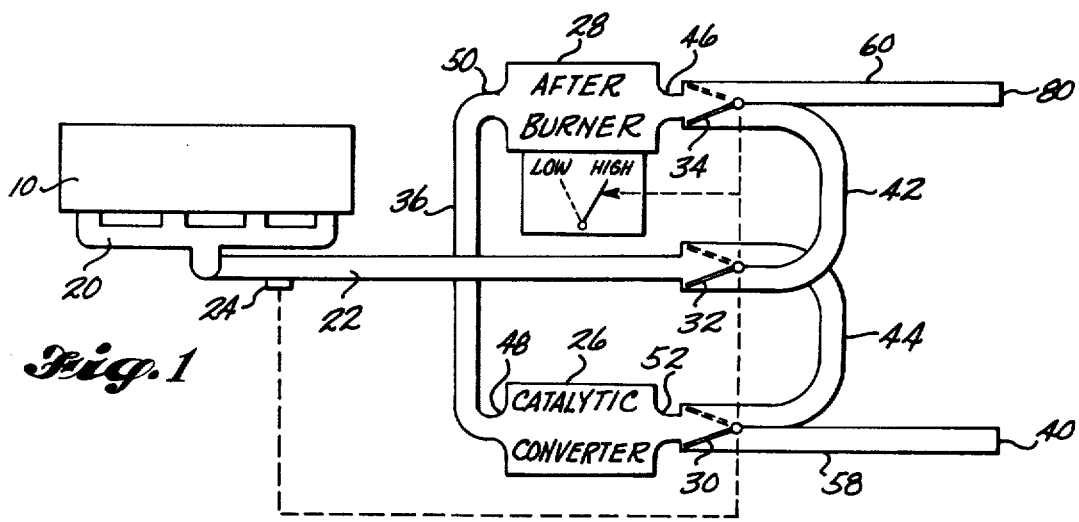
FIG. 1 is a schematic view of an embodiment of this invention relating to afterburner utilization for heating of exhaust gases coupled to a catalytic converter for processing.

Turning now to FIG. 1 there is shown an internal combustion engine 10 having an exhaust manifold 20 and an exhaust pipe 22. Temperature sensor 24 is mounted on tail pipe 22 and is responsive to the temperature of the exhaust flowing inside tail pipe 22. Tail pipe 22 under normal engine temperatures encountered passes exhaust from exhaust manifold 20 to catalytic converter 26 and thereafter to afterburner 28 and subsequently the processed exhaust passes to the atmosphere through a first outlet 80.

Below a predetermined temperature engine exhaust cannot warm converter 26 to an efficient reaction temperature. As a consequence, in prior art systems, e.g., U.S. Pat. No. 3,645,098 there have been provided storage means for containing unreacted exhaust constituents which passed through the converter until the converter temperature was above the predetermined temperature required for reaction and then the stored gas recycled through. However, in the system of FIG. 1, when the temperature of the exhaust flowing through to catalytic converter 26 is below reaction temperature (e.g., the period during warm up), temperature sensor 24 energizes valve means comprising valves 30, 32, and 34 to couple afterburner 28 into the exhaust flow path upstream of catalytic converter 26 to provide heated exhaust input to catalytic converter 26 as long as the sensed level remains below the predetermined temperature. Temperature sensor energizes valves 30, 32, and 34 to the dotted line positions under the above conditions of lower than predetermined temperature exhaust conditions sensed during engine warm up, however, when the exhaust temperature from manifold 20 sensed exceeds the predetermined temperature (after engine warm up), valves 30, 32, and 34 return to their nonenergized state as represented by the solid line positions and the exhaust is no longer preheated by afterburner 28 prior to passage through converter 26 and further, afterburner 28 returns to the primary function of afterburning at high temperatures to further purify the exhaust. It should be further noted that afterburner 28 may be switched to a lower temperature when operated in the exhaust preheat mode for catalytic converter 26 and returned to high temperature operation when operating in the afterburner mode downstream of converter 26.

In the preheat mode valve 32 (in the dotted line position) couples exhaust from exhaust pipe 22 to first pipe coupling section 42 which couples the exhaust through valve 34 (in the dotted line position) to first port 46 of afterburner 28. The heated exhaust is then transmitted from second port 50 through common pipe section 36 to second port 48 of catalytic converter 26, and thence from first port 52 through first exhaust pipe extension 58 to first outlet 40.

In the normal mode of operation (with exhaust temperature sensed by sensor 24 above the predetermined level required for efficient catalytic reaction) valves 30, 32, and 34 are in the nonenergized (solid line position) and exhaust proceeds from manifold 20 through exhaust pipe 22, valve 32, second pipe section 44, valve 30, first port 52 of catalytic converter 26, second port 48, common pipe section 36, second port 50 and first port 46 of afterburner 28, valve 34, second exhaust pipe extension 60 to outlet 80 and into the atmosphere.

Figure 2:
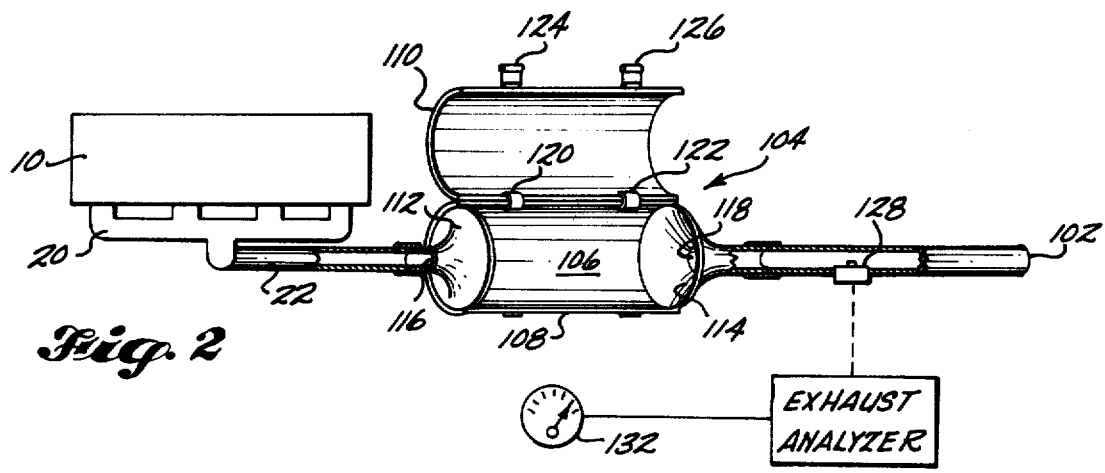
FIG. 2 is a schematic exemplary of a further embodiment of this invention showing a housing arrangement in an exhaust pipe providing for removal of catalyst prior to expiration of the lifetime of the catalyst or upon failure of the catalyst to provide means for maintaining the exhaust quality above a predetermined level.

The embodiment of FIG. 2 illustrative of an exhaust emission control system wherein means are provided for replacing a catalyst cartridge or catalyst element or support member in a housing or cylindrical casing in the exhaust flow path upon indicated failures of the converter 104 to provide minimum level of exhaust gas processing required as by deterioration of catalyst or plugging of passages or channels and consequent lowered efficiency of operation.

Internal combustion engine 10 having an exhaust manifold is provided with an exhaust pipe 22 having an exhaust outlet 102. Coupled in the exhaust pipe 22 between exhaust manifold 20 and outlet 102 is an exhaust gas reaction device indicated generally at 104. The exhaust gas reaction device 104 comprises a tubular shaped container 106 having a cyclindrically shaped wall member 108 and semi-cylindrically shaped closure means 110 for opening container 106 to remove the internally positioned catalyst support member (not shown) which may be a catalytic element such as the catalyst element denoted numeral 15 in U.S. Pat. No. 3,692,497 which is of circular cross section and is incorporated herein by reference, or one of the types shown herein in FIGS. 3, 4, 5, or 6. The end wall frustoconical members 112 and 114 form the end closure members of tubular shaped container 106 with end closure member 112 on the upstream end of the exhaust flow path having an inlet opening 116 coupled to exhaust pipe 22 for receiving exhaust gases from manifold 20. Downstream closure member 114 has an aperture 116 forming an outlet for transmitting the reacted gases to the atmosphere via outlet 102 at the end of the exhaust pipe. Semi-cylindrically shaped closure means 110 is pivotally attached to casing 108 by hinges 120 and 122 so that it may be swung open by rotation about an axis passing through the hinges and parallel to the central axis of tubular shaped container 106. The semi-cylindrical shape of closure means 110 permits withdrawal of catalyst support members having a circular cross section. Two fasteners 124 and 126 are utilized to hold wall portion 110 of container 106 forming the closure means in a closed position subsequent to the insertion of a new catalyst support member in the form of a removable cartridge. The exhaust emission control configuration of FIG. 2 permits replacement of the catalyst support member without removal of the outer housing or casing 108 which is normally welded or permanently fastened in the exhaust pipe as shown by the upper and lower welds and forms a permanent part of exhaust system hardware. Exchange of catalyst cartridge to maintain exhaust purification efficiency and potential recovery of catalyst and support structure for reprocessing or reuse is thereby facilitated. Heretofore, in exhaust purifiers as required in indoor operated lift trucks, the use of vibrator and vacuum hose and a human operator have been utilized to physically blow out and replace the pellets in the exhaust purifier in situ and may be contrasted with the present catalyst support structures and exhaust system hardware which overcomes such tedious procedures for replacement of catalyst.

Returning now to FIG. 2 it will be noted that probe 128 of exhaust analyzer 130 for analyzing the gas constituents to be purified is inserted in the exhaust flow path downstream of catalytic converter 104 to provide a readout of emission quality on a display means comprising meter 132. Exhaust analyzer 130 may comprise an infrared type analyzer such as the type MEXA-300 CO/HC analyzer manufactured by Olson-Horiba Corporation of Southfield, Michigan, when the converter 104 contains an oxidation catalytic material such as in the aforementioned U.S. Pat. No. 3,692,497 for processing air polluting constituents such as hydrocarbons and carbon monoxide, the meter 132 of which apparatus may be mounted on the instrument panel to provide an indication to the motor vehicle operator of whether his emission quality is below that permitted and therefore whether he needs a replacement catalyst support member or cartridge. Instead of meter 132 and exhaust analyzer 130 coupled to probe 128, other less expensive detector and indicator arrangements having less accuracy may be utilized including, e.g., an indicator arrangement having merely a threshold circuit actuating a red panel lamp when the unpermitted level of exhaust gas constituent has been exceeded.

Figure 3:
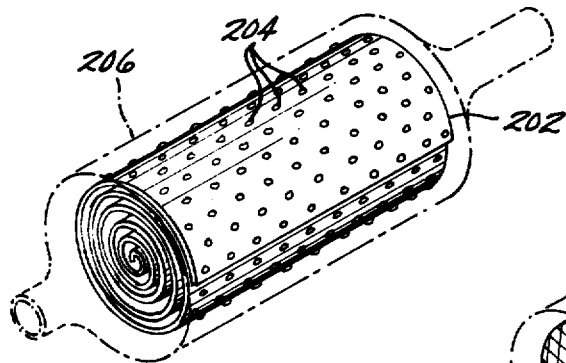
FIG. 3 is a catalytic converter structure showing catalyst support structure utilizing a single sheet for providing predetermined spacings between facing catalyst surfaces.

Turning now to FIG. 3, it may be seen that the catalyst support member 202 comprises a metal sheet having an uneven surface comprising protrusions 204 extending from both major surfaces thereof, the protrusions 204 of which are coated with the catalyst which may extend over the remaining areas of the sheet between the protrusions 204. The protrusions themselves may instead be formed from catalyst build up from the surface of sheet 202. In manufacture of catalyst support member 202, if the protrusions 204 are closely spaced, e.g., their average heights above the surface support member 202 is approximately equal to the spacings between them, then the catalyst coatings can be extended over the entire surface of sheet 202, while if the average spacing exceeds the average heights it may be preferred to coat only the protrusions 204 to conserve catalytic material which otherwise might not be utilized as efficiently in the remaining low resistance paths along the surface of the sheet which form the sides of the exhaust flow channel. Support member 202 may be inserted supportively as a cartridge in container 106 of FIG. 2 or in a unitary casing structure of the type utilized in the prior art. It should be noted that where container 206 is the same design as container 106 removal of catalysts support member 202 may be made upon deterioration of catalytic conversion efficiency and the catalyst and/or support structure may be reprocessed or prepared for reuse.

Figure 4:
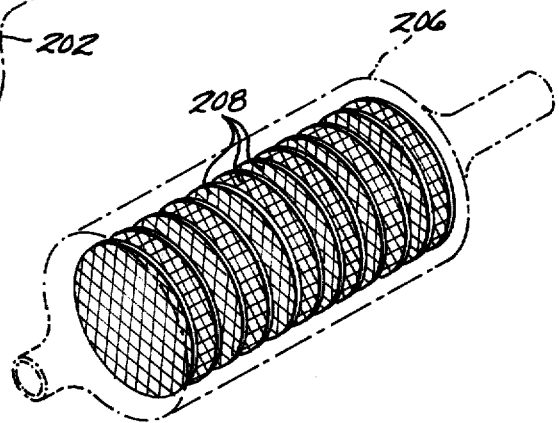
FIG. 4 is a catalytic converter structure utilizing a screen type support structure for the catalyst to provide desired flow of exhaust and exposure of exhaust to the catalyst.

A further catalyst support structure is shown in FIG. 4 comprising a plurality of screen structures 208 positioned transversely of and distributed in spaced relationship along the central axis of container 206, the individual screen structures 208 may comprise a metallic or ceramic or combination of these materials as the skeletal support structure of the aforementioned U.S. Pat. No. 3,692,497, and the catalyst coating supported may be an oxidizing catalyst of the same type utilized also in this patent, the coating herein being disposed over the entire surface area of the screens. Portions of the screen support structures (apertures therein) may be fouled or plugged without impedance of exhaust flow at further points along the path through the converter as would occur where individual channels run the entire length of the converter as in U.S. Pat. No. 3,692,497.

Turning now to FIG. 5, a container or casing 206 of the type previously discussed may be seen to electrically insulatively support a pair of electrically conductive metal rings 302 and 304 spaced apart at opposite ends of tubular container 206. Electrically insulative disc members 306 and 308 support rings 302 and 304 respectively from the frusto-conical end walls of container 206 while an electrically insulative cylindrical sleeve member 310 which may comprise a ceramic material surrounds the catalyst cartridge and the outer surfaces of support rings 302 and 304. The catalyst cartridge and cylindrical sleeve member 310 may be removed if container 206 is structured as container 106 of FIG. 2. Electrically conductive rings 302 and 304 are each individually strung with electrically conductive support wires 316 which make electrical contact with their respective rings 302 and 304. The support wires 316 on rings 302 and 304 provide support for the filament wires 318 strung in parallel relationship between and electrically connected to the support wires 316 on either of end rings 302 and 304. Conductive metallic filament wires 318 support a layer of the catalyst over their surfaces. The filament wires 318 supporting the catalyst coatings are connected in series circuit path with a source of potential 330 and a first switching means 332 which when closed applies the potential 330 between rings 302 and 304 to support wires 316 on each of these rings causing a heating current to flow through filaments 318 coupled between rings 302 and 304 thereby causing heating directly of the catalyst coatings on these filaments. First switching means 332 is energized to a closed position thereby closing the series circuit path comprising source potential 330 and filaments 318 when ignition key 334 is turned on energizing relay coil 336 of switching means 332. This presumes second switching means 338 also in series circuit path with filaments 318 is also closed. During warm up, temperature sensor 24 energizes switching means 338 to a closed position thus heating filaments 318 since the temperature of exhaust detected by sensor 24 is below the predetermined level required to maintain the catalyst layers on filaments 318 efficient in the catalytic conversion process. With this circuit arrangement for coupling source potential 330 across filaments 318, the filaments are heated only during exhaust warm up however the catalytic converter structure of FIG. 5 may be connected to another form of control circuit if it is desired to heat and maintain the catalyst temperature at some fixed higher level than would naturally occur due to exhaust heating as where the catalyst coating selected works most efficiently at some higher temperature.

The converter embodiment of FIG. 6 shown in cross section in FIG. 7 comprises a catalyst support member which is plural channeled, viz., a honeycomb structure 401 having the interior wall surfaces coated with a catalyst material comprising, e.g., an oxidation catalyst and thus providing a structure similar to that denoted by numeral 15 in U.S. Pat. No. 3,692,497. The channels 403 of the honeycomb structure 401 however have wire filaments 405 strung along the centers thereof which filaments 405 are conductively connected electrically in series between end terminals 407 and 409. Filaments 405 (when an electrical current is passed through them by coupling of a source of potential between terminals 407 and 409) in the embodiment of FIGS. 6 and 7 comprise heating elements for indirectly heating the catalytic surfaces of the channels of the honeycomb structure 401 whereas in the embodiment of FIG. 5, the heating elements 318 provide direct heating of the catalyst since directly supported as a coating by these elements 318. The energizing control circuit of the FIG. 6 embodiment is the same as the energizing control circuit of the FIG. 5 embodiment already described. It should be noted as mentioned earlier that the filaments 318 of FIG. 5 or indirect heating (of the catalyst) filaments 405 of FIGS. 6 and 7 as shown provide instant heating of the catalyst after ignition turn on without dependence upon exhaust warm up to bring the catalyst to effective conversion temperature, however, other control circuits may be coupled to the preceding filament heating systems to cause heating at other times besides the period of exhaust warm up, e.g., during certain other periods of engine operation the control circuits may provide increased heating when a more efficient catalytic action and consequent, e.g., higher temperature for such efficiency mode is required such as at times when more purification is required. A precise control of catalyst converter temperature is provided by control of current in the aforementioned filamentary type catalyst heating structures which may thereby employ these or other catalysts at their controlled efficient temperatures which may be higher than normal exhaust temperatures.

I claim:

1. In combination in an internal combustion engine power plant having a combustion chamber, exhaust manifold, and an exhaust passage for exhaust gas flow from said exhaust manifold to the atmosphere:

a catalytic converter coupled in series with said exhaust passage effective to cause reaction of exhaust gas constituents flowing therethrough when the temperature of said catalytic converter is above a predetermined temperature level to thereby prevent emission of said constituents to the atmosphere;

an exhaust gas afterburner coupled in series with said exhaust passage downstream from said catalytic converter;

means coupled to said afterburner for heating exhaust gas in said exhaust passage upstream from said catalytic converter to a temperature level greater than said predetermined temperature; and, said means coupled to said afterburner comprising;

temperature sensing means responsive to the temperature of exhaust gas in said exhaust passage upstream from said catalytic converter; and, duct means responsive to said temperature sensing means for coupling said afterburner in said exhaust passage upstream from said catalytic converter when the temperature sensed by said temperature sensing means is below said predetermined temperature, said duct means including means for reversing the exhaust flow path through said exhaust gas afterburner and said catalytic converter; and, means for switching said afterburner to a lower temperature when the temperature sensed is below said predetermined temperature and switching said afterburner to a higher temperature in response to detection of exhaust gas temperature above said predetermined temperature.

2. The combination according to claim 1 wherein said afterburner in said exhaust passage is coupled upstream from said catalytic converter in the period during warm up of said internal combustion engine power plant.

* * * * *